United States Patent
Yao et al.

(10) Patent No.: US 10,142,024 B2
(45) Date of Patent: Nov. 27, 2018

(54) HIGHER-LEVEL CLOCK AND DATA RECOVERY (CDR) IN PASSIVE OPTICAL NETWORKS (PONS)

(71) Applicant: Futurewei Technologies, Inc., Plano, TX (US)

(72) Inventors: Shuchang Yao, Wuhan (CN); Lei Zhou, Shenzhen (CN); Minghui Tao, Wuhan (CN); Xiang Liu, Marlboro, NJ (US); Frank Effenberger, Colts Neck, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/378,362

(22) Filed: Dec. 14, 2016

(65) Prior Publication Data

US 2018/0167143 A1  Jun. 14, 2018

(51) Int. Cl.
*H04B 10/69* (2013.01)
*H04B 10/2575* (2013.01)
*H04B 10/27* (2013.01)
*H04B 10/524* (2013.01)
*H04B 10/54* (2013.01)
*H04L 7/033* (2006.01)
*H04L 25/03* (2006.01)

(52) U.S. Cl.
CPC ....... *H04B 10/25752* (2013.01); *H04B 10/27* (2013.01); *H04B 10/524* (2013.01); *H04B 10/541* (2013.01); *H04B 10/6971* (2013.01); *H04L 7/0331* (2013.01); *H04L 25/03057* (2013.01); *H04L 2025/03369* (2013.01)

(58) Field of Classification Search
CPC ..................................... H04B 10/69–10/6973
See application file for complete search history.

(56) References Cited

U.S. PATENT DOCUMENTS 9,184,906 B1 * 11/2015 Min .................... H04L 7/0058
9,337,993 B1    5/2016 Lugthart et al.
2004/0203559 A1 * 10/2004 Stojanovic ............ H04L 25/063
                                                                    455/403

(Continued)

OTHER PUBLICATIONS

Zerbe et al., "Equalization and clock recovery for a 2.5-10-Gb/s 2-PAM/4-PAM backplane transceiver cell," in IEEE Journal of Solid-State Circuits, vol. 38, No. 12, pp. 2121-2130, Dec. 2003. doi: 10.1109/JSSC.2003.818572; URL: http://ieeexplore.ieee.org/stamp/stamp.jsp?tp=&arnumber=1253859&isnumber=28052.*

(Continued)

*Primary Examiner* — Nathan M Cors
(74) *Attorney, Agent, or Firm* — Conley Rose, P.C.

(57) ABSTRACT

An apparatus comprises: a CDR sub-system comprising: an FFE; a decision component coupled to the FFE; a subtractor coupled to the FFE and the decision component; and a tap weight updater coupled to the subtractor and the FFE; and a PR-MLSE component coupled to the CDR sub-system. A method comprises: converting an optical signal with a first modulation format to an analog electrical signal; converting the analog electrical signal to a first digital signal; equalizing the first digital signal into a second digital signal with a second modulation format, wherein the second modulation format has more levels than the first modulation format; and performing CDR on the second digital signal.

22 Claims, 18 Drawing Sheets

(56) References Cited

U.S. PATENT DOCUMENTS

| | | |
|---|---|---|
| 2010/0061737 A1 | 3/2010 | Kato |
| 2011/0311008 A1* | 12/2011 | Slezak .................... H03M 9/00 |
| | | 375/353 |
| 2013/0294492 A1 | 11/2013 | Miao |
| 2014/0140706 A1 | 5/2014 | Zhou et al. |
| 2014/0146867 A1* | 5/2014 | Shvydun ........... H04L 25/03057 |
| | | 375/233 |
| 2016/0218899 A1 | 7/2016 | Hoshyar et al. |
| 2017/0085324 A1* | 3/2017 | Rylyakov ............... H04B 10/58 |

OTHER PUBLICATIONS

Yin, Xin, et al., "A 10Gb/s APD-based linear burst-mode receiver with 31dB dynamic range for reach-extended PON systems," Optics Express B462, vol. 20, No. 26, Dec. 10, 2012, 8 pages.

Foreign Communication From a Counterpart Application, PCT Application No. PCT/CN2017/114818, English Translation of International Search Report dated Feb. 26, 2018, 5 pages.

Foreign Communication From a Counterpart Application, PCT Application No. PCT/CN2017/114818, English Translation of Written Opinion dated Feb. 26, 2018, 4 pages.

* cited by examiner

| Two-Level Converging | Phase Error (ui) | 0 | 1/16 | 2/16 | 3/16 | 4/16 | 5/16 | 6/16 | 7/16 |
|---|---|---|---|---|---|---|---|---|---|
| | Converging Time (Bits) | 51911 | 50522 | 49572 | 49017 | 48993 | 49426 | 50105 | 51044 |
| | Converging Time (ns) | 2.0764e+03 | 2.0209e+03 | 1.9829e+03 | 1.9607e+03 | 1.9597e+03 | 1.9770e+03 | 2.0042e+03 | 2.0418e+03 |

FIG. 4

| Phase error (UI) | 0 | 1/16 | 2/16 | 3/16 | 4/16 | 5/16 | 6/16 | 7/16 |
|---|---|---|---|---|---|---|---|---|
| Four-Level Converging Converging Time (Bits) | 4068 | 3675 | 3224 | 3288 | 3610 | 9836 | 8402 | 7537 |
| Converging Time (ns) | 162.72 | 147 | 128.96 | 131.52 | 144.4 | 393.44 | 336.08 | 301.48 |

FIG. 6

| Phase error (ui) | 0 | 1/16 | 2/16 | 3/16 | 4/16 | 5/16 | 6/16 | 7/16 |
|---|---|---|---|---|---|---|---|---|
| Three-Level Converging Converging Time (Bits) | 2789 | 2947 | 3741 | 4048 | 3264 | 2776 | 2394 | 2075 |
| Converging Time (ns) | 111.56 | 117.88 | 149.64 | 161.92 | 130.56 | 111.04 | 95.76 | 83 |

FIG. 13

| Phase Error (ui) | 0 | 1/16 | 2/16 | 3/16 | 4/16 | 5/16 | 6/16 | 7/16 |
|---|---|---|---|---|---|---|---|---|
| Seven-Level Converging Converging Time (Bits) | 2427 | 2427 | 2478 | 2629 | 2661 | 2793 | 3133 | 2936 |
| Converging Time (ns) | 97.08 | 97.08 | 99.12 | 105.16 | 106.44 | 111.72 | 125.32 | 117.44 |

HIGHER-LEVEL CLOCK AND DATA RECOVERY (CDR) IN PASSIVE OPTICAL NETWORKS (PONS)

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A PON is a system for providing network access over a final portion of a telecommunications network. A PON is a P2MP network comprising an OLT at a CO, an ODN, and ONUs at user premises. PONs may also comprise RNs located between the OLTs and the ONUs, for instance, at an end of a road where multiple customers reside.

In recent years, TDM PONs such as GPONs and EPONs have been deployed worldwide for multimedia applications. In TDM PONs, the total capacity is shared among multiple users using a TDMA scheme, and as a result the average bandwidth for each user may be below 100 Mb/s. EPONs use WDM and provide rates up to 10 Gb/s. Next-generation EPONs may be required to implement 100 Gb/s due to increasing customer demands.

Future approaches include four-channel WDM networks with 25 Gb/s bit rates per wavelength channel and fewer-channel WDM networks with even higher bit rates per single channel. As bit rate demand continues to increase, bandwidth restrictions meant to efficiently use existing devices may result in severe ISI. ISI is a significant challenge for CDR for high-speed PONs. In particular, for high-speed, upstream, burst-mode transmissions in PONs, a converging speed and a quality of the CDR can significantly affect data transmission quality.

SUMMARY

In one embodiment, the disclosure includes an apparatus comprising: an OE component configured to convert an optical signal with a first modulation format to an analog electrical signal; an ADC coupled to the OE component and configured to convert the analog electrical signal to a first digital signal; and a CDR sub-system coupled to the OE component and configured to: equalize the first digital signal into a second digital signal with a second modulation format, wherein the second modulation format has more levels than the first modulation format; and perform CDR on the second digital signal. In some embodiments, the apparatus further comprises a PR-MLSE component coupled to the CDR sub-system and configured to equalize the second digital signal into a third electrical signal with the first modulation format; the PR-MLSE component is further configured to further equalize the second digital signal using PR-MLSE; the CDR sub-system comprises an FFE, a decision component, a subtractor, and a tap weight updater that form a feedback loop, and wherein the PR-MLSE component is outside the feedback loop; the first modulation format has two levels for an NRZ signal and the second modulation format has three levels; the first modulation format has four levels for a PAM4 signal and the second modulation format has seven levels; the CDR sub-system comprises an FFE configured to: perform the CDR for phase adjustment; and perform equalization for ISI compensation; the FFE is further configured to adaptively track frequency offset and jitter; the CDR sub-system is further configured to perform equalization until an MSE of an equalized signal is below a predetermined threshold; the apparatus is an OLT, and wherein the analog electrical signal is a burst-mode signal; the OE component is a PD, a TIA, or a combination of the PD and the TIA.

In another embodiment, the disclosure includes an apparatus comprising: a CDR sub-system comprising: an FFE; a decision component coupled to the FFE; a subtractor coupled to the FFE and the decision component; and a tap weight updater coupled to the subtractor and the FFE; and a PR-MLSE component coupled to the CDR sub-system. In some embodiments, the apparatus further comprises an ADC coupled to the CDR sub-system; the apparatus further comprises a VCO coupled to the ADC; the apparatus further comprises a TIA coupled to the ADC; the apparatus further comprises a PD coupled to the TIA; the apparatus further comprises a decoder coupled to the PR-MLSE component coupled to the PR-MLSE component.

In yet another embodiment, the disclosure includes a method comprising: converting an optical signal with a first modulation format to an analog electrical signal; converting the analog electrical signal to a first digital signal; equalizing the first digital signal into a second digital signal with a second modulation format, wherein the second modulation format has more levels than the first modulation format; and performing CDR on the second digital signal. In some embodiments, the method further comprises equalizing the second digital signal into a third electrical signal with the first modulation format using PR-MLSE; the method further comprises performing equalization until an MSE of an equalized signal is below a predetermined threshold.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a table illustrating a two-level converging time for different clock phase errors for the FFE in FIG. 2B.

FIG. 6 is a table illustrating a four-level converging time for different clock phase errors for the FFE in FIG. 2B.

FIG. 13 is a table illustrating a converging time for the FFE in FIG. 7 equalizing a two-level NRZ signal using three-level equalization according to an embodiment of the disclosure.

FIG. 15 is a table illustrating a converging time for the FFE in FIG. 7 equalizing a four-level PAM4 signal using seven-level equalization according to an embodiment of the disclosure.

DETAILED DESCRIPTION

Figure 1:
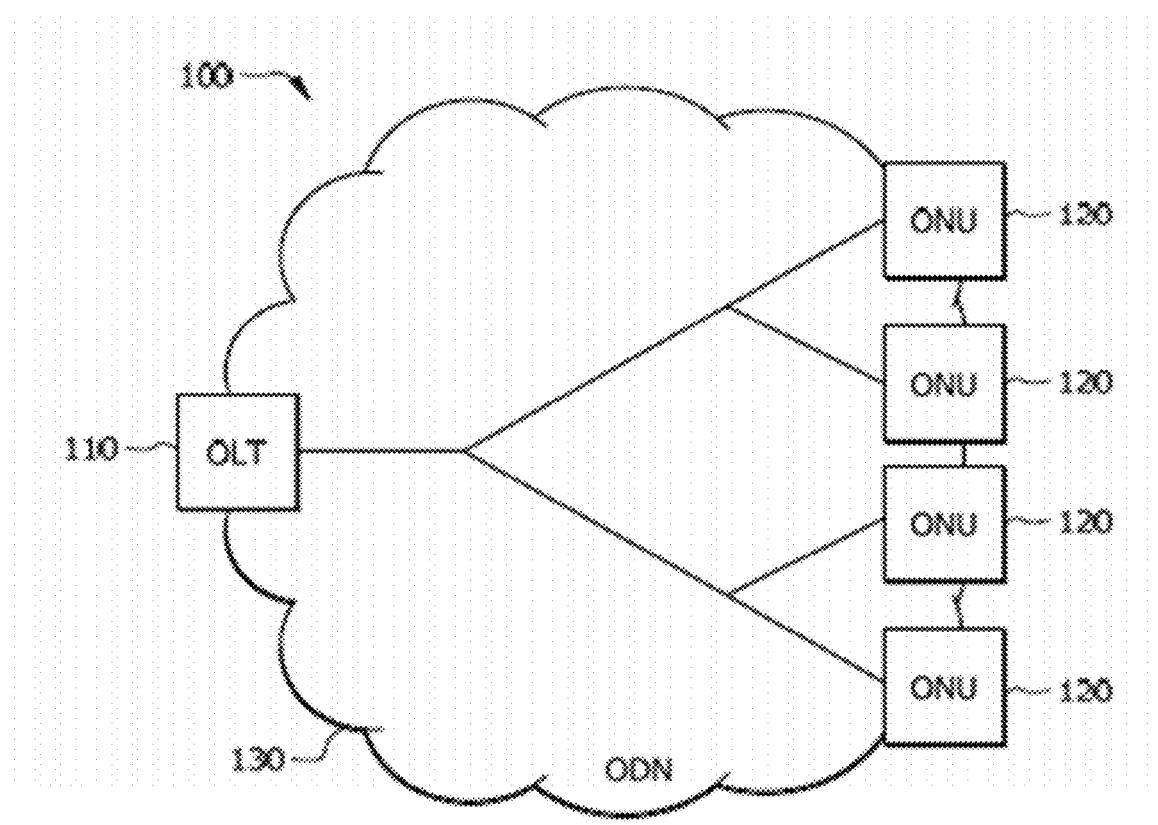
FIG. 1 is a schematic diagram of a PON.

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following acronyms and initialisms apply:
ADC: analog-to-digital converter
APD: avalanche PD
ASIC: application-specific integrated circuits
BER: bit error rate
BM: burst-mode
CDR: clock and data recovery
CO: central office
CPU: central processing unit
dB: decibel(s)
DFE: decision feedback equalizer
DSP: digital signal process (ing, or)
EML: electro-absorption modulated laser
EPON: Ethernet PON
EO: electrical-to-optical
FFE: feed-forward equalizer
FPGA: field-programmable gate array
GBd: gigabaud
Gb/s: gigabits per second
GPON: gigabit PON
GEPON: gigabit Ethernet PON
ISI: inter-symbol interference
LO: local oscillator
MAC: media access control
Mb/s: megabits per second
MLSE: maximum-likelihood sequence estimation
ms: millisecond(s)
MSE: mean square error
NRZ: non-return-to-zero
ns: nanosecond(s)
OA: optical amplifier
ODN: optical distribution network
OE: optical-to-electrical
OLT: optical line terminal
ONU: optical network unit
P2MP: point-to-multipoint
PAM4: four-level pulse-amplitude modulation
PD: photodiode
PON: passive optical network
PR: partial response
RAM: random-access memory
RN: remote node
ROM: read-only memory
RX: receiver
SOA: semiconductor optical amplifier
SRAM: static RAM
SSMF: standard single-mode fiber
TCAM: ternary content-addressable memory
TDM: time-division multiplexing
TDMA: time-division multiple access
TIA: transimpedance amplifier
TX: transmitter
ui: unit interval
VCO: voltage-controlled oscillator
VGA: variable-gain amplifier
VOA: variable optical attenuator
WDM: wavelength-division multiplexing
μs: microsecond(s).

It is desirable to implement an equalization approach that achieves convergence with fewer symbols while maintaining or decreasing an MSE. Such an approach should also reduce system complexity and ISI sensitivity. According to various embodiments of the present disclosure, embodiments for higher-level CDR in PONs are disclosed. The embodiments comprise a single FFE, which may be referred to as a fractional FFE because it performs at least two functions, namely CDR for phase adjustment and equalization for ISI compensation. The FFE is adaptive so that it can track frequency offset and jitter. For those reasons, the FFE reduces ADC and DSP complexity. In addition, the FFE implements higher-level CDR, for instance three-level CDR for NRZ signals and seven-level CDR for PAM4 signals. The higher-level CDR shortens a CDR convergence time, which allows for low-cost, narrow-bandwidth options; ensures satisfaction of conversion times required in various PON standards; and reduces equalization noise. The embodiments apply to both downstream receivers such as ONUs and upstream receivers such as OLTs, though upstream receivers receiving burst-mode signals may appreciate the most benefit. Those burst-mode signals may be up to at least 40 Gb/s.

FIG. 1 is a schematic diagram of a PON 100. The PON 100 is a communication network and comprises an OLT 110, a plurality of ONUs 120, and an ODN 130 that couples the OLT 110 to the ONUs 120. The PON 100 is suitable for implementing the disclosed embodiments.

The OLT 110 communicates with the ONUs 120 and another network. Specifically, the OLT 110 is an intermediary between the other network and the ONUs 120. For instance, the OLT 110 forwards data received from the other network to the ONUs 120 and forwards data received from the ONUs 120 to the other network. The OLT 110 comprises a transmitter and a receiver. When the other network uses a network protocol that is different from the protocol used in the PON 100, the OLT 110 comprises a converter that converts the network protocol to the PON protocol and vice versa. The OLT 110 is typically located at a central location such as a CO, but it may also be located at other suitable locations.

The ODN 130 is a data distribution system that comprises optical fiber cables, couplers, splitters, distributors, and other suitable components. The components include passive optical components that do not require power to distribute signals between the OLT 110 and the ONUs 120. The components may also include active components such as optical amplifiers that do require power. The ODN 130 extends from the OLT 110 to the ONUs 120 in a branching configuration as shown, but the ODN 130 may be configured in any other suitable P2MP manner.

The ONUs 120 communicate with the OLT 110 and customers and act as intermediaries between the OLT 110 and the customers. For instance, the ONUs 120 forward data from the OLT 110 to the customers and forward data from the customers to the OLT 110. The ONUs 120 comprise optical transmitters that convert electrical signals into optical signals and transmit the optical signals to the OLT 110, and the ONUs 120 comprise optical receivers that receive optical signals from the OLT 110 and convert the optical signals into electrical signals. The ONUs 120 further comprise second transmitters that transmit the electrical signals to the customers and second receivers that receive electrical signals from the customers. ONUs 120 and ONTs are similar, and the terms may be used interchangeably. The ONUs 120 are typically located at distributed locations such as customer premises, but they may also be located at other suitable locations.

Figure 2A:
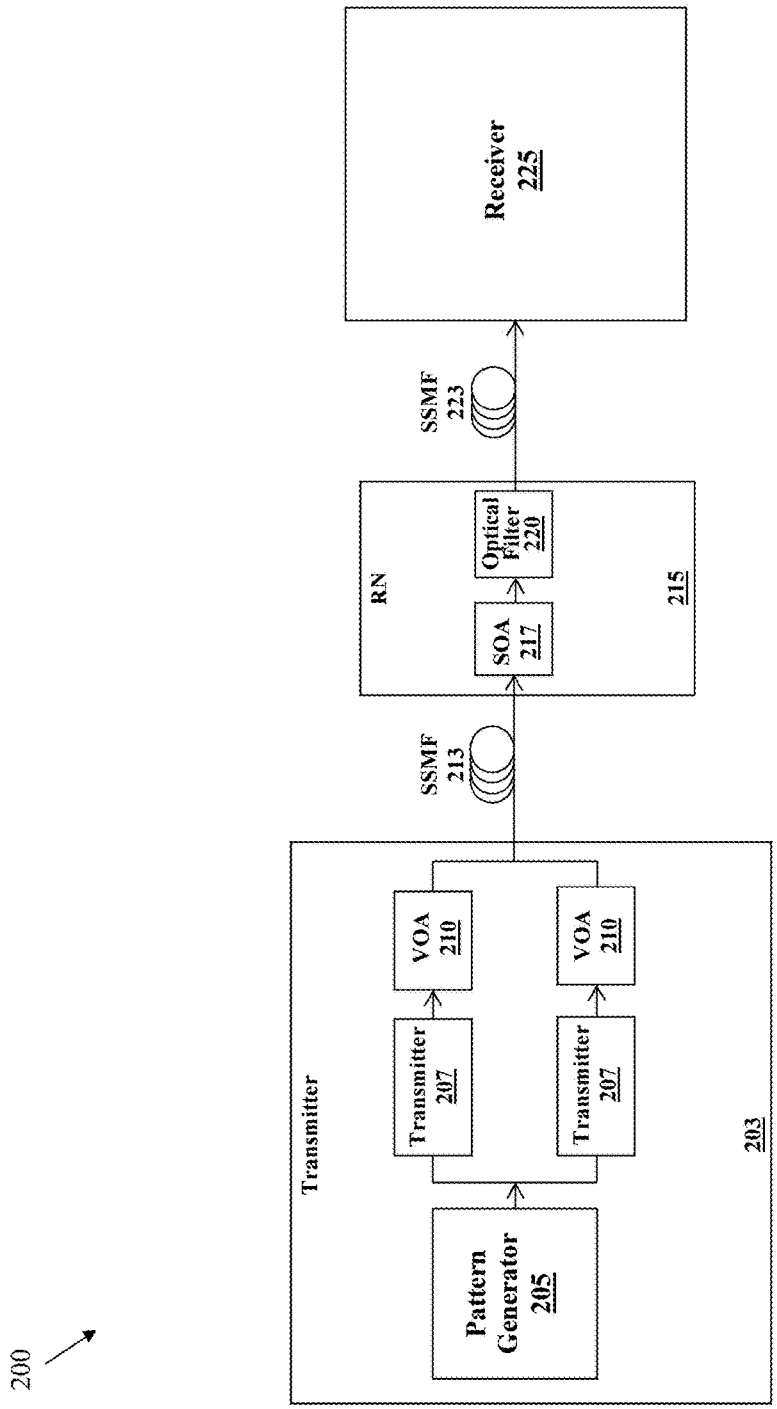
FIG. 2A is a schematic diagram of a data communication system.

FIG. 2A is a schematic diagram of a data communications system 200. The data communications system 200 is described in Xin Yin, et al., "A 10 Gb/s APD-based linear burst-mode receiver with 31 dB dynamic range for reach-extended PON systems," Optics Express, vol. 20, no. 26, Dec. 3, 2012, which is incorporated by reference. The data communications system 200 generally comprises a transmitter 203; SSMFs 213, 223; an RN 215; and a receiver 225. The transmitter 203 may be implemented in the OLT 110 and the receiver 225 may be implemented in one of the ONUs 120 or vice versa, and the SSMFs 213, 223 and the RN 215 may be implemented in the ODN 130.

The transmitter 203 comprises a pattern generator 205, transmitters 207, and VOAs 210. The pattern generator 205 generates optical signals of certain patterns and provides optical signals of a first pattern to a first transmitter 207 and optical signals of a second pattern to a second transmitter 207. The transmitters 207 transmit the optical signals to the VOAs 210. The VOAs 210 amplify the optical signals and transmit the optical signals to the RN 215 via the SSMF 213.

The RN 215 comprises a SOA 217 and an optical filter 220. The SOA 217 amplifies the optical signals. The optical filter 220 selectively modifies the optical signals to achieve optimal signal properties for high transmission performance and transmits the optical signals to the receiver 225 via the SSMF 223. The receiver 225 performs channel equalization on the optical signals. The receiver 225 is described further below with respect to FIG. 2B.

Figure 2B:
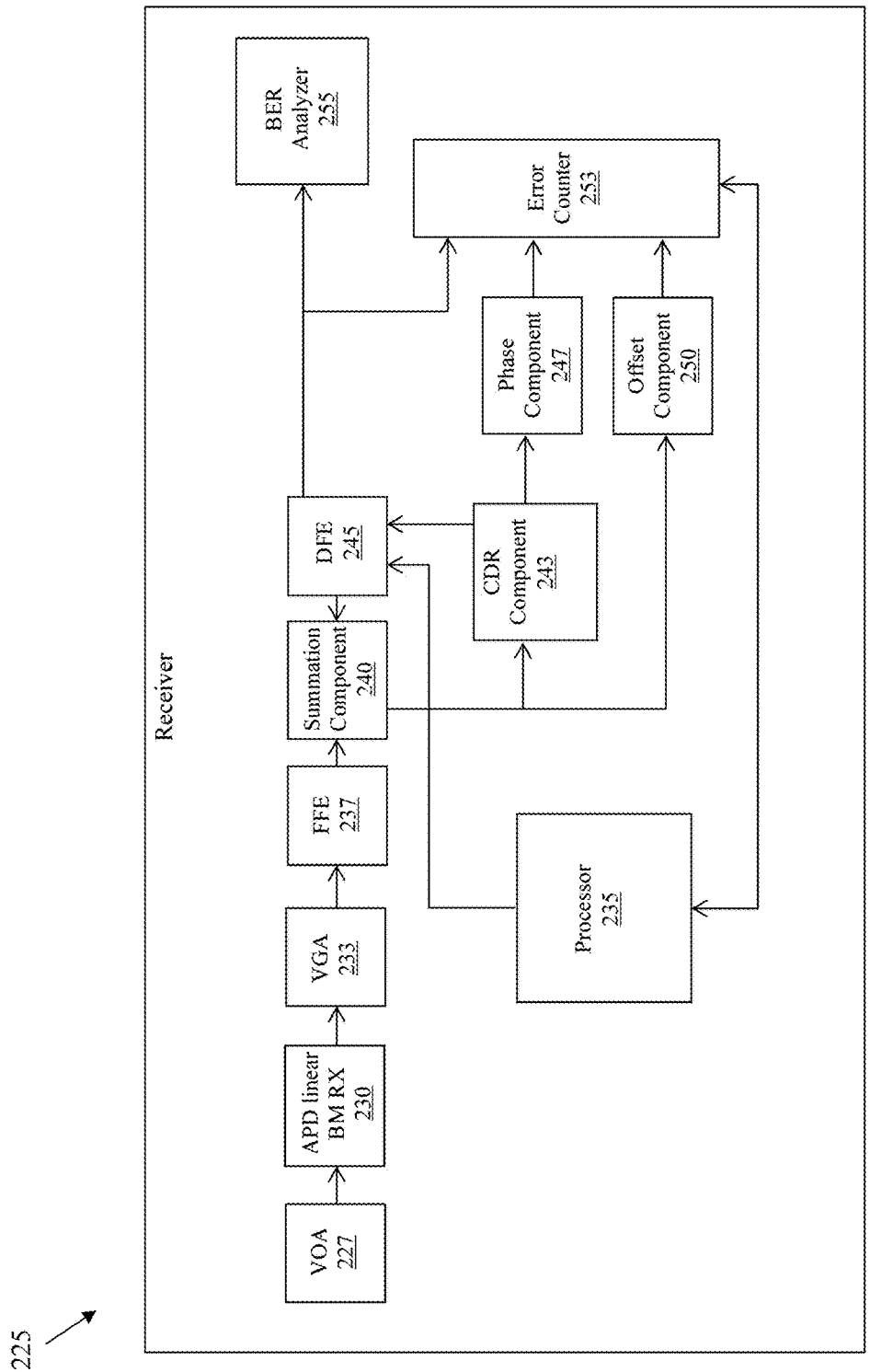
FIG. 2B is a schematic diagram of the receiver in FIG. 2A.

FIG. 2B is a schematic diagram of the receiver 225 in FIG. 2A. The receiver 225 comprises a VOA 227, an APD linear BM RX 230, a VGA 233, a processor 235, an FFE 237, a summation component 240, a CDR component 243, a DFE 245, a phase component 247, an offset component 250, an error counter 253, and a BER analyzer 255. As mentioned above, the receiver 225 receives the optical signals from the RN 215 via the SSMF 223. The VOA 227 lowers the optical signal strength in order to match a desirable receiving quality. The APD linear BM RX 230 converts the optical signals into electrical signals. The VGA 233 amplifies and samples the electrical signals to generate burst digital signals. The FFE 237 performs a linear equalization on the burst digital signals to generate linear equalized signals.

The summation component 240 sums a linear equalized signal from the FFE 237 and a DFE signal from the DFE 245 to form a summed equalized signal. The summation component 240 repeatedly performs the summation until channel equalization is completed, which means when a sampling phase is optimized and the summed equalized signal is converged. The CDR component 243 performs CDR to generate a recovered signal. The DFE 245 performs estimation on the recovered signal to generate the DFE signal.

The phase component 247 aligns the recovered signal's phase with the clock during channel equalization. The offset component 250 adjusts the signals to offset loss. The error counter 253 calculates error data based on the DFE signal, values from the phase component 247, and values from the offset component 250. The BER analyzer 255 performs analyses on the DFE signal to determine a number of bit errors. The equalization and the CDR are performed continuously until the signals converge and the sampling phase is optimized. The processor 235 determines when the equalization on the optical signals is completed. As shown, to guarantee performance of the receiver 225, the CDR component 243, the FFE 237, and the DFE 245 are independent from each other, but that increases complexity, cost, convergence time, and the sensitivity of the receiver 225 to ISI.

Figure 3:
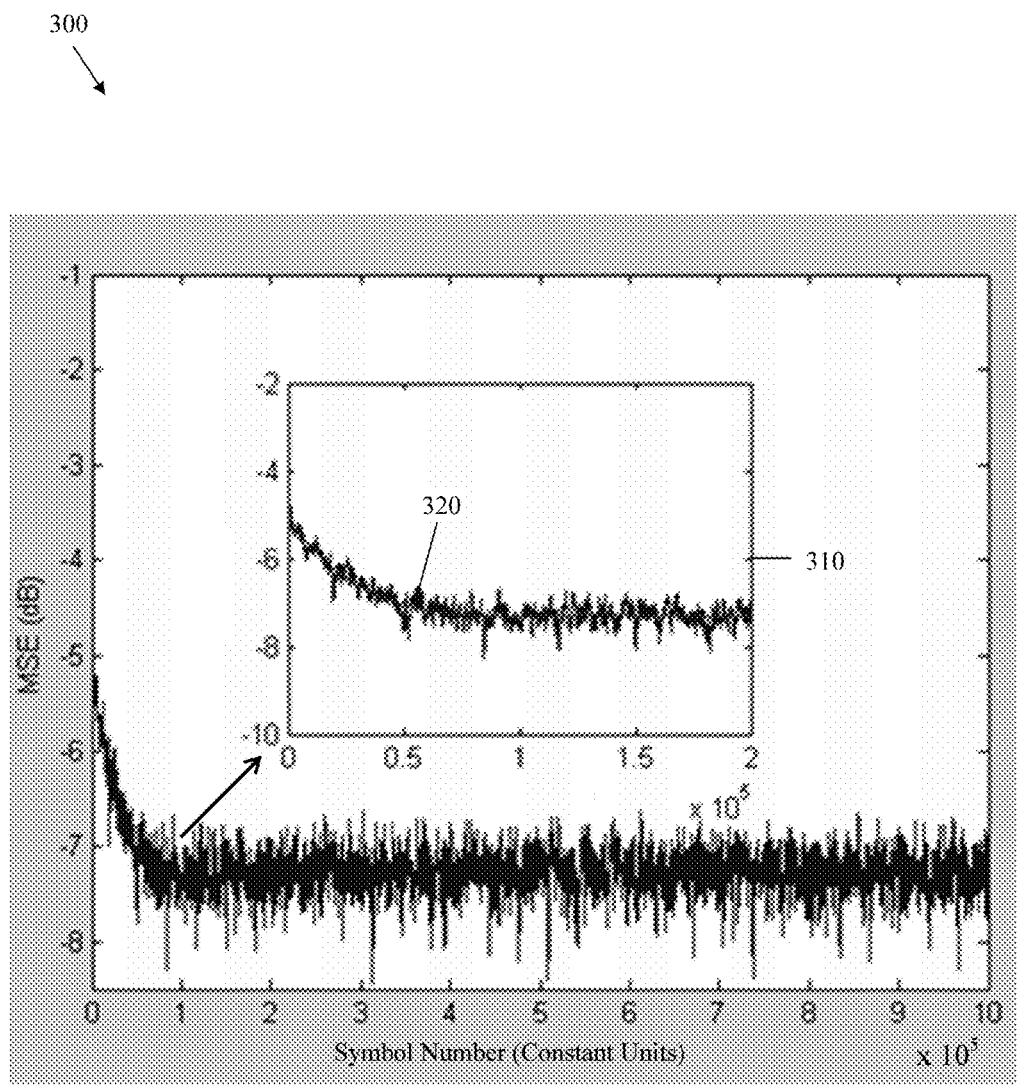
FIG. 3 is a graph illustrating a two-level equalization erroring in the FFE in FIG. 2B.

FIG. 3 is a graph 300 illustrating a two-level equalization error in the FFE 237 in FIG. 2B. Specifically, the graph 300 demonstrates experimental results for a 25 Gb/s PON employing NRZ modulation using a 10 Gb/s EML and APD. The graph 300 includes a sub-graph 310 that is a magnified portion of the graph 300 as indicated by an arrow. The x-axis represents a symbol number in constant units, and the y-axis represents an MSE in dB. Convergence occurs when a curve 320 flattens out, which occurs at 51,911 symbols after 2.07 µs, which is a relatively long time for channel equalization. After convergence, the MSE is about −8 dB.

FIG. 4 is a table 400 illustrating a two-level converging time for different clock phase errors for the FFE 237 in FIG. 2B. To comprehensively estimate a CDR converging time, data with different initial sampling phases is captured and processed. Thus, the table 400 further illustrates that a phase error affects the convergence times shown in FIG. 3. The table 400 comprises three sets of values, a phase error in constant ui, a first converging time in bits and a second converging time measure in ns. As shown, the maximum CDR converging time of 51,911 symbols and 2.07 µs ($2.0764 \times 10^3$ ns) appears at the sampling point with zero ui phase error.

Figure 5:
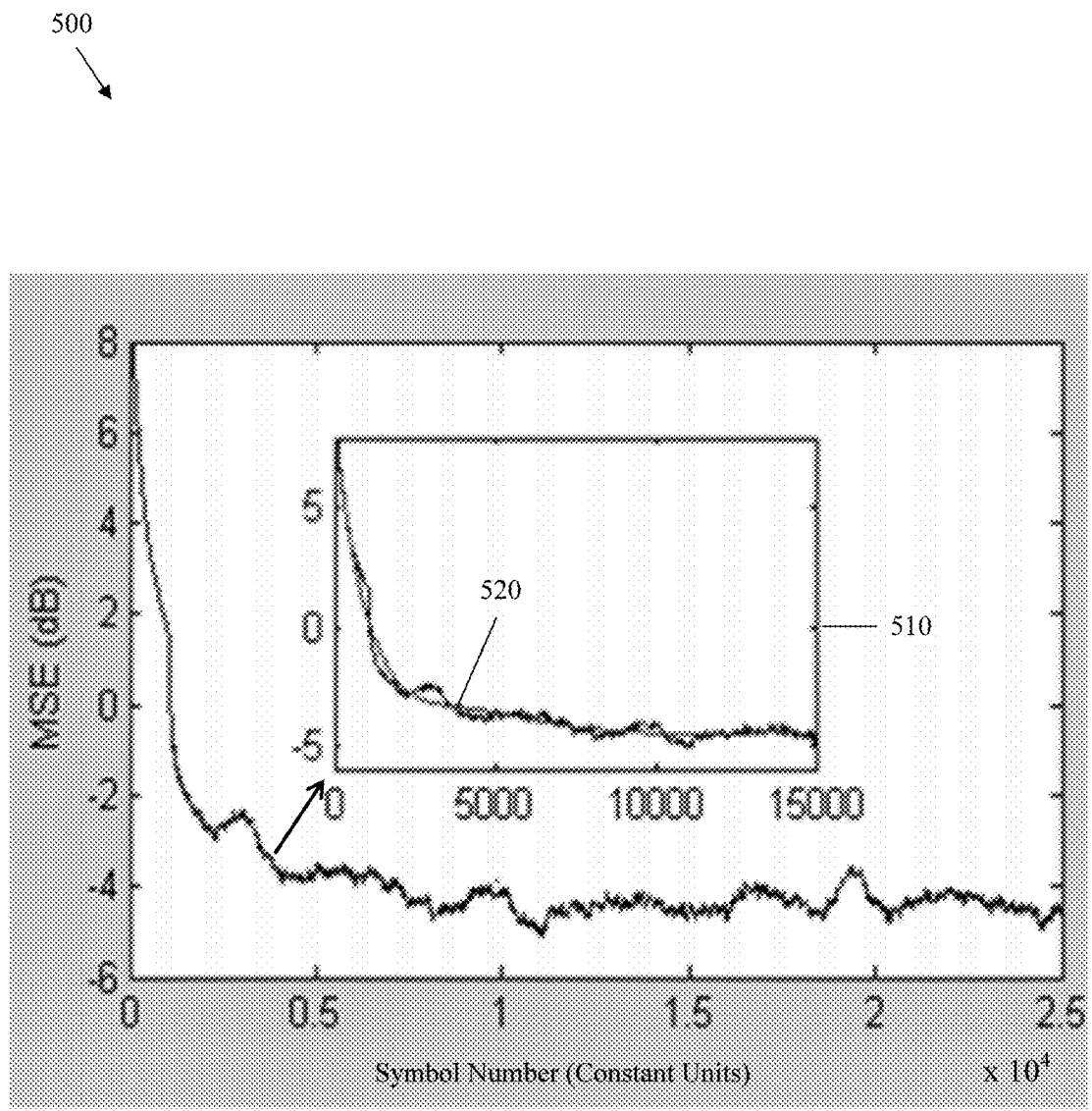
FIG. 5 is a graph illustrating a four-level equalization error in the FFE in FIG. 2B.

FIG. 5 is a graph 500 illustrating a four-level equalization error in the FFE 237 in FIG. 2B. Specifically, the graph 500 demonstrates experimental results for a 50 Gb/s PON employing 25 GBd PAM4 modulation using a 10 Gb/s EML and APD. The graph 500 includes a sub-graph 510 that is a magnified portion of the graph 500 as indicated by an arrow. The x-axis represents a symbol number in constant units, and the y-axis represents an MSE in dB. Convergence occurs when a curve 520 flattens out, which occurs at 7,537 symbols after 301.48 ns. After convergence, the MSE is about −5 dB.

FIG. 6 is a table 600 illustrating a four-level converging time for different clock phase errors for the FFE 237 in FIG. 2B. The table 600 further illustrates that a phase error affects the convergence times shown in FIG. 5. The table 600 comprises three sets of values, a phase error in constant unit interval (ui), a first converging time in bits, and a second converging time in ns. As shown, the maximum CDR converging time of 9,836 symbols and 393.44 ns appears at the sampling point with 5/16 ui phase error.

As demand for faster and increased data transmission rises, processing and equalization of that data must also be faster. Especially when development speeds of low-cost, high-bandwidth electrical components is not as fast as the increase of PON data rates, bandwidth restrictions will introduce severe ISI. In that situation, channel equalization approaches such as the two-level and four-level equalization shown above may not be fast enough. It is therefore desirable to implement an equalization approach that achieves convergence with fewer symbols while maintaining or decreasing an MSE. Such an approach should also reduce system complexity and ISI sensitivity.

Disclosed herein are embodiments for higher-level CDR in PONs. The embodiments comprise a single FFE, which may be referred to as a fractional FFE because it performs at least two functions, namely CDR for phase adjustment and equalization for ISI compensation. The FFE is adaptive so that it can track frequency offset and jitter. For those reasons, the FFE reduces ADC and DSP complexity. In addition, the FFE implements higher-level CDR, for instance three-level CDR for NRZ signals and seven-level CDR for PAM4 signals. The higher-level CDR shortens a CDR convergence time, which allows for low-cost, narrow-bandwidth options; ensures satisfaction of conversion times required in various PON standards; and reduces equalization noise. The embodiments apply to both downstream receivers such as ONUs and upstream receivers such as OLTs, though upstream receivers receiving burst-mode signals may appreciate the most benefit. Those burst-mode signals may be up to at least 40 Gb/s.

Figure 7:
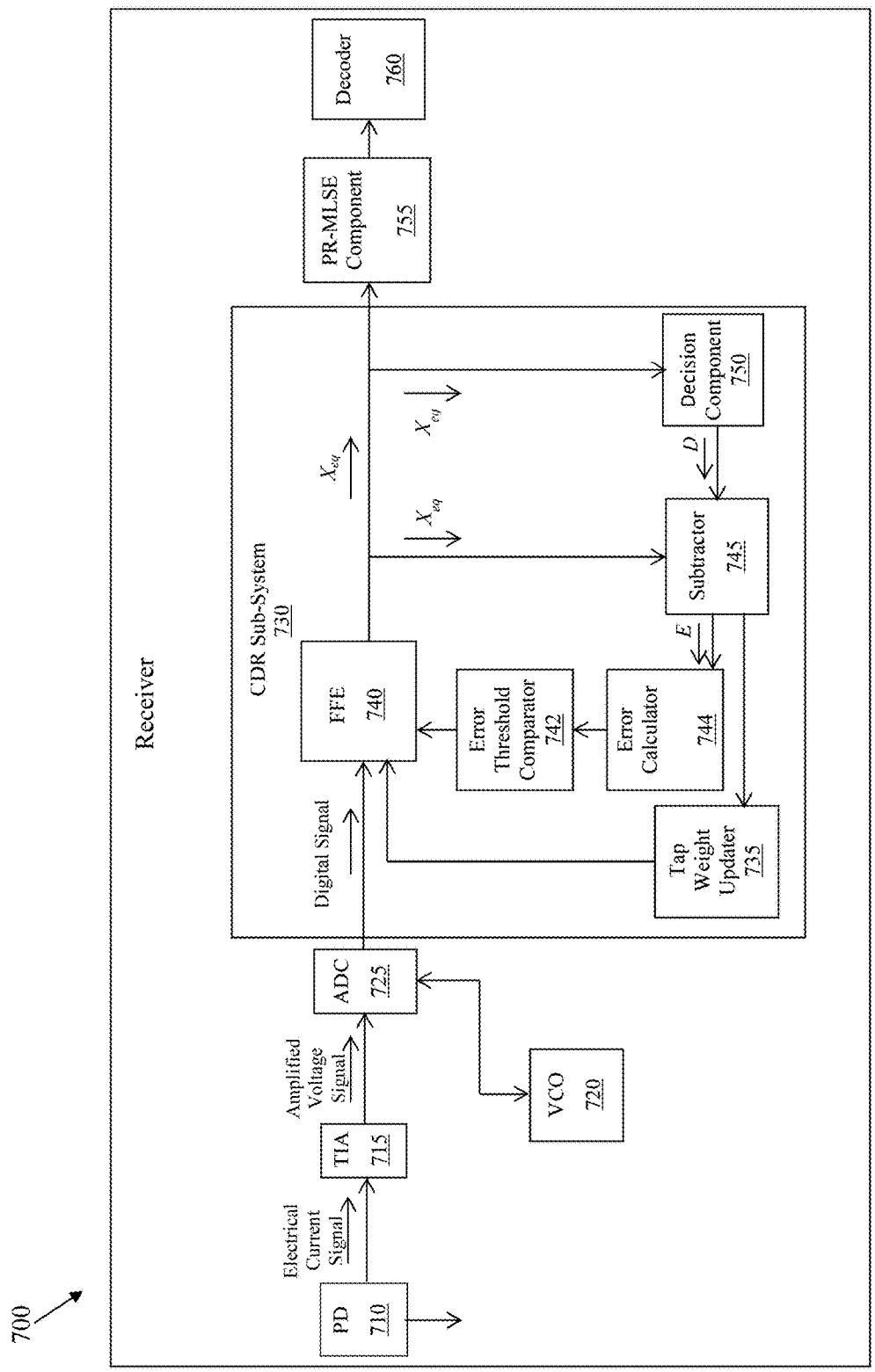
FIG. 7 is a schematic diagram of a higher-level CDR receiver according to an embodiment of the disclosure.

FIG. 7 is a schematic diagram of a receiver 700 according to an embodiment of the disclosure. The receiver 700 may be implemented in the OLT and the ONUs 120, and the receiver 700 may implement the receiver 225. The receiver 700 comprises a PD 710, a TIA 715, a VCO 720, an ADC 725, a CDR sub-system 730, a PR-MLSE component 755, and a decoder 760.

The PD 710 converts a burst-mode optical signal into an electric current signal. The TIA 715 converts the electric current signal into an amplified voltage signal. The ADC 725 samples the amplified voltage signal and converts the amplified voltage signal, which is an analog electrical signal, to a digital electrical signal. The VCO 720 samples the ADC 725 to synchronize a frequency between the receiver 700 and a transmitter. However, the receiver 700 and the transmitter may operate at different phases, which may be referred to as phase error. Phase error and ISI are shown in FIG. 8.

Figure 8:
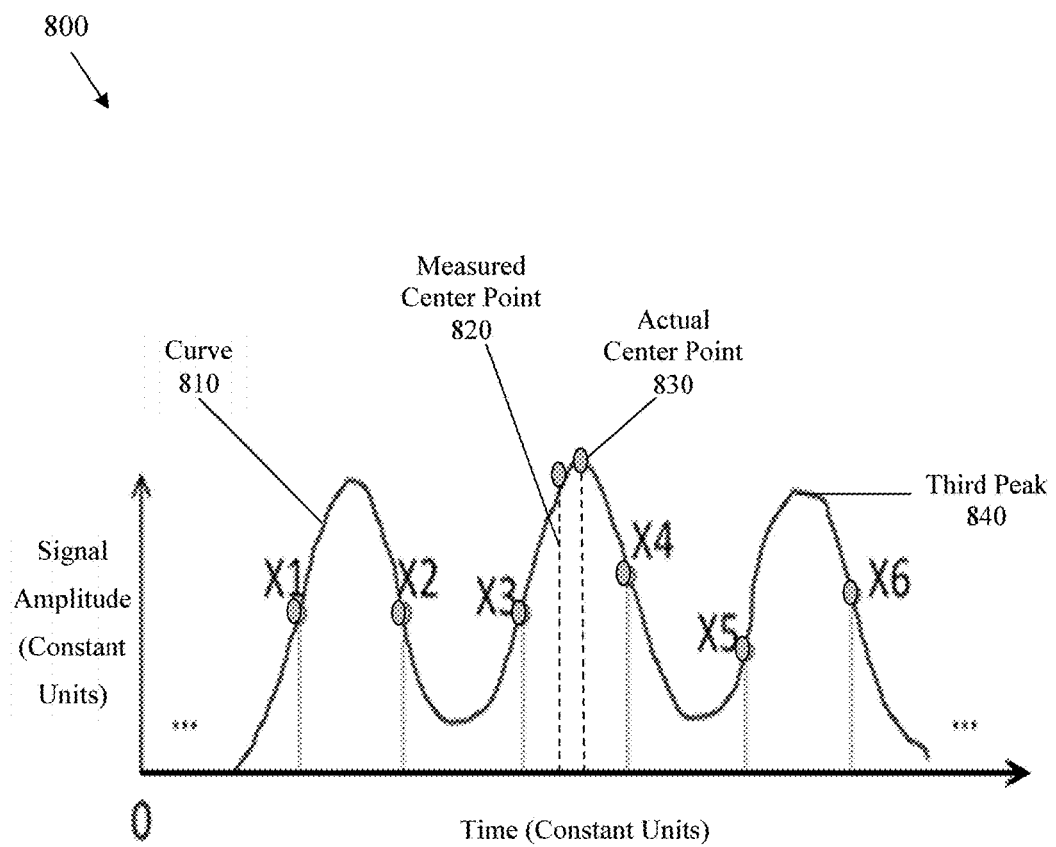
FIG. 8 is a graph illustrating phase error and ISI.

FIG. 8 is a graph 800 illustrating phase error and ISI. The x-axis represents time in constant units, and the y-axis represents signal amplitude in constant units. The graph 800 comprises a curve 810 representing a sampled signal, for instance a sampled signal from the ADC 725, that is sampled at six sampling points, X1, X2, X3, X4, X5, X6. The sample points should be at the middle signal amplitude of each peak in the amplified voltage signal. However, due to imperfections in a channel such as the SSMFs 213, 223, the sample points may not be. First, there may be phase error so that the ADC samples the simplified voltage signal at the wrong points. Thus, the measured center point 820 between sample points X3 and X4 is to the left of the actual center point 830 between sample points X3 and X4. In addition, ISI may distort the peaks of the curve 810. Thus, the third peak is widened on the left side so that the sample point X5 is lower than the middle signal amplitude of the third peak 840.

Returning to FIG. 7, the CDR sub-system 730 comprises a tap weight updater 735, an FFE 740, an error threshold comparator 742, an error calculator 744, a subtractor 745, and a decision component 750, which together form a feedback loop to perform CDR and equalization and thus compensate for the phase error and ISI described above. Specifically, in a first iteration, the FFE 740 passes to the subtractor 745 an equalized signal $X_{eq}$, which is the sampled signal from the ADC 725 for the first iteration. The decision component 750 passes to the subtractor 745 decision datum D, which is a training sequence for the first iteration. The subtractor 745 calculates an error signal E as follows:

$$E = X_{eq} - D. \quad (1)$$

The subtractor 745 passes the error signal to the tap weight updater 735 and the error calculator. Based on the error signal, the tap weight updater 735 calculates tap weights W(1), W(2), W(3), W(4), W(5), W(6) corresponding to the sampling points X1, X2, X3, X4, X5, X6, respectively.

In subsequent iterations, the FFE 740 calculates the equalized signal as follows:

$$X_{eq} = W(1)X(1) + W(2)X(2) + W(3)X(3) + W(4)X(4) + W(5)X(5) + W(6)X(6), \quad (2)$$

where X(1), X(2), X(3), X(4), X(5), X(6) correspond to amplitudes of the sampled signal at the sampling points X1, X2, X3, X4, X5, X6, respectively. The FFE 740 passes the equalized signal to the subtractor 745 and the decision component 750. As shown below in FIGS. 10A 11A, under the severe ISI introduced by the restriction of optical devices, the received signal is overlapped in the time domain bit by bit and is more like a higher-level signal, for instance a three-level signal for NRZ and a seven-level signal for PAM-4, rather than the transmitted two-level NRZ signal or four-level PAM-4 signal. Therefore, it is easier to obtain convergence if the decision component 750 determines the decision datum based on the following higher-level decision principle:

$$D = \begin{cases} 6 & \text{if } X_{eq} > 5 \\ 4 & \text{if } X_{eq} > 3 \\ 2 & \text{if } X_{eq} > 1 \\ 0 & \text{if } -1 \leq X_{eq} \leq 1 \\ -2 & \text{if } X_{eq} < -1 \\ -4 & \text{if } X_{eq} < -3 \\ -6 & \text{if } X_{eq} < -5. \end{cases} \quad (3)$$

The subtractor 745 calculates the error signal using equation (1), the tap weight updater 735 calculates the tap weights based on the error signal, and the FFE 740 again calculates the equalized signal using equation (2).

That feedback loop continues until the equalized signal converges and therefore has an equalization error at or below a predetermined threshold. Specifically, the error calculator 744 calculates the MSE of the equalization error. The error threshold comparator 742 determines whether the MSE is less than the threshold. If the error is equal to or less than the threshold, then the error threshold comparator 742 instructs the CDR sub-system 730 to discontinue the feedback loop. If the error is greater than the threshold, then the error threshold comparator 742 provides no instruction to the CDR sub-system 730 or instructs the CDR sub-system 730 to continue the feedback loop. The threshold is, for instance, −6 dB.

Though six tap weights, sampling points, and amplitudes are described, the CDR sub-system 730 may employ any suitable number of tap weights, sampling points, and amplitudes. In addition, the decision datum is a three-level decision datum applicable to, for instance, two-level NRZ signals. Similarly, the decision datum may be seven-level decision datum applicable to, for instance, PAM4 signals. Regardless of the level of the incoming signal, the CDR sub-system 730 may implement higher-level decision datum. Furthermore, though a threshold is described for determining convergence, the CDR sub-system 730 may implement any suitable indicator of convergence.

The tap weight updater 735 notifies the FFE 740 that the equalized signal is converged. Thereafter, the FFE 740 passes the equalized signal to the PR-MLSE component 755. The PR-MLSE component 755 uses the known channel response to map the binary decision bit into higher-level bits through a summation of a former and a latter bit at individual time instances. The combinations of different possible decision bits form different trellis paths The PR-MLSE component 755 uses the path with a lowest Euclid distance compared to the equalized signal after the FFE 740 to be the most reliable bit path. The PR-MLSE component 755 outputs bits on the most reliable path and de-maps those bits into a binary signal. Through the above steps, the PR-MLSE component 755 performs an MLSE on the equalized signal to convert the equalized signal to an estimated signal, which is a binary, two-level signal. The decoder 760 decodes the estimated signal to generate a decoded signal for further processing.

Figure 9:
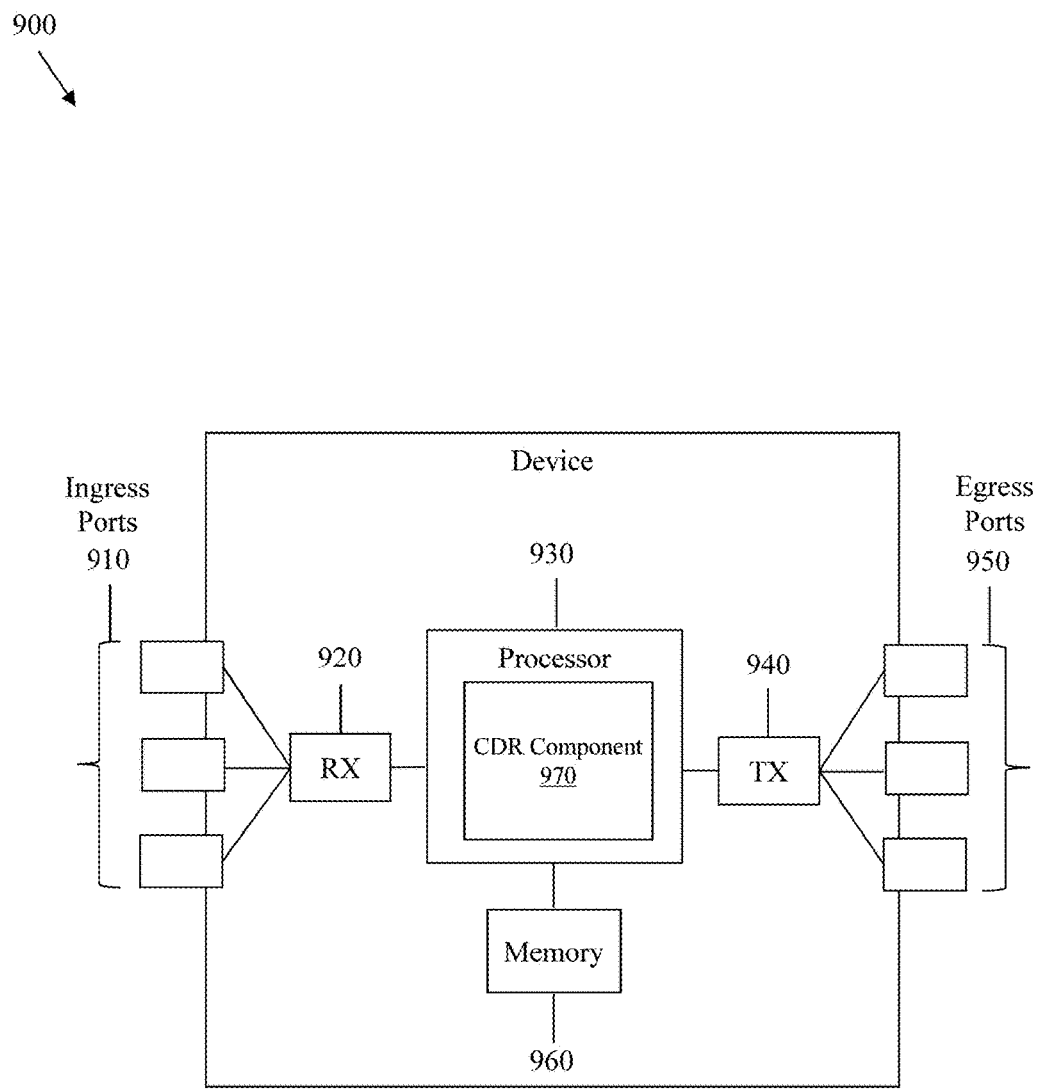
FIG. 9 is a schematic diagram of a device according to an embodiment of the disclosure.

FIG. 9 is a schematic diagram of a device 900 according to an embodiment of the disclosure. The device 900 may implement the disclosed embodiments, for instance the receiver 700. The device 900 comprises ingress ports 910 and an RX 920 for receiving data; a processor, logic unit, or CPU 930 to process the data; a TX 940 and egress ports 950 for transmitting the data; and a memory 960 for storing the data. The device 900 may also comprise OE components and EO components coupled to the ingress ports 910, the RX 920, the TX 940, and the egress ports 950 for ingress or egress of optical or electrical signals.

The processor 930 is implemented by any suitable combination of hardware, middleware, firmware, and software. The processor 930 may be implemented as one or more CPU chips, cores (e.g., as a multi-core processor), FPGAs, ASICs, or DSPs. The processor 930 is in communication with the ingress ports 910, RX 920, TX 940, egress ports 950, and memory 960. The processor 930 comprises a CDR component 970, which may implement the disclosed embodiments. The inclusion of the CDR component 970 therefore provides a substantial improvement to functionality of the device 900 and effects a transformation of the device 900 to a different state. Alternatively, the memory 960 stores the CDR component 970 as instructions, and the processor 930 executes those instructions.

The memory 960 comprises one or more disks, tape drives, or solid-state drives and may be used as an over-flow data storage device, to store programs when such programs are selected for execution, or to store instructions and data that are read during program execution. The memory 960 may be volatile or non-volatile and may be any combination of ROM, RAM, TCAM, or SRAM.

Figure 10A:
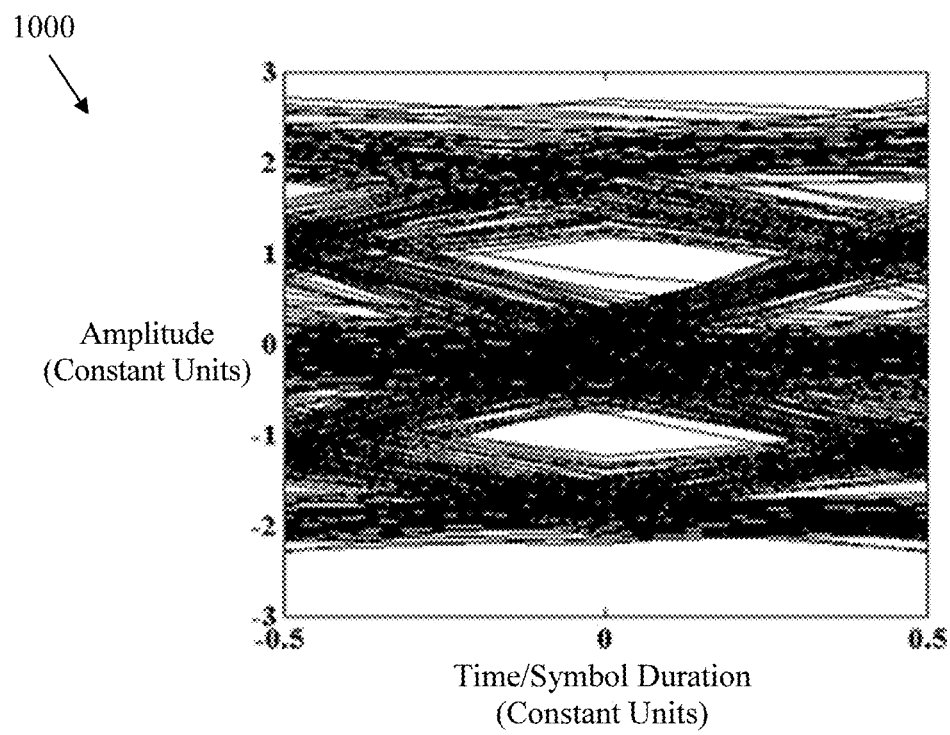
FIG. 10A is a diagram illustrating a two-level NRZ signal prior to three-level CDR.

FIG. 10A is a diagram 1000 illustrating a two-level NRZ signal prior to three-level CDR. The x-axis represents time or symbol duration in constant units, and the y-axis represents amplitude in constant units. As can be seen, the two-level NRZ signal appears to have almost three levels and is not well defined due to ISI.

Figure 10B:
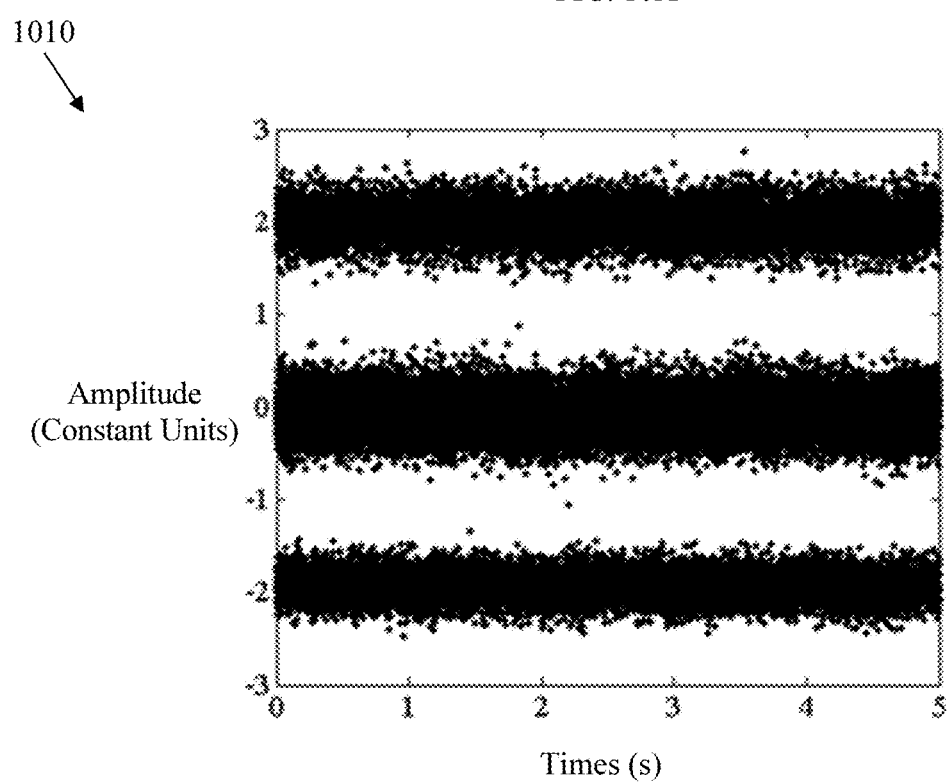
FIG. 10B is a graph illustrating a three-level NRZ signal after higher-level CDR performed in FIG. 7 according to an embodiment of the disclosure.

FIG. 10B is a graph 1010 illustrating a three-level NRZ signal after higher-level CDR according to an embodiment of the disclosure. The x-axis represents time in seconds, and the y-axis represents amplitude in constant units. As shown, the higher-level CDR substantially eliminates ISI to produce a well-defined, three-level NRZ signal unlike the two-level NRZ signal in FIG. 10A.

Figure 11A:
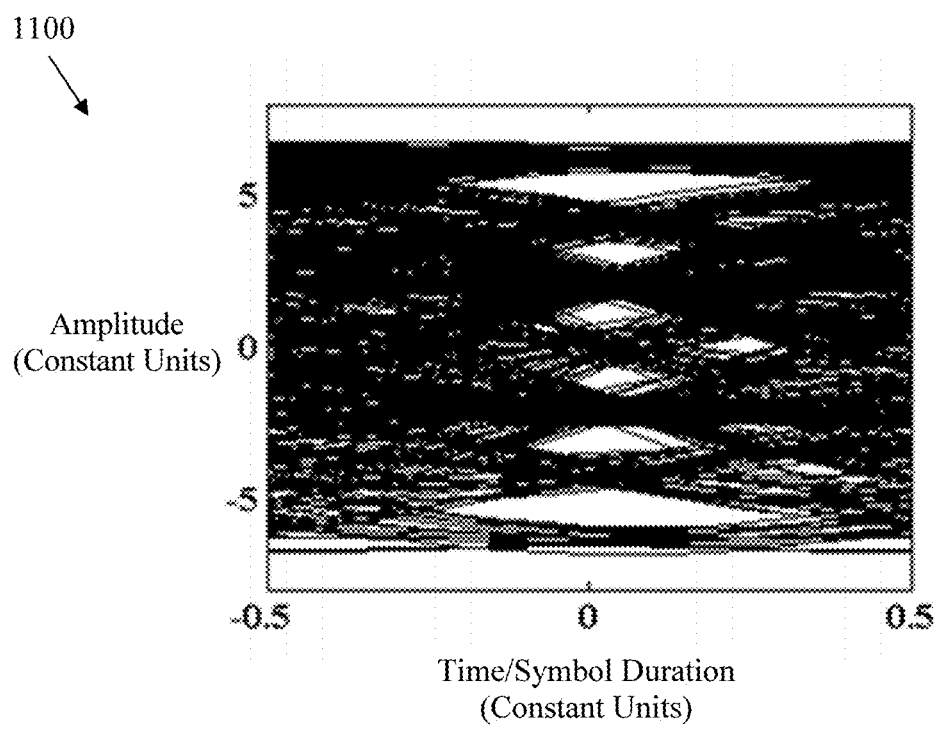
FIG. 11A is a diagram illustrating a four-level PAM4 signal prior to seven-level CDR.

FIG. 11A is a diagram 1100 illustrating a four-level PAM4 signal prior to seven-level CDR. The x-axis represents time in seconds, and the y-axis represents amplitude in constant units. As can be seen, the four-level PAM4 signal appears to have almost seven levels and is not well defined due to ISI.

Figure 11B:
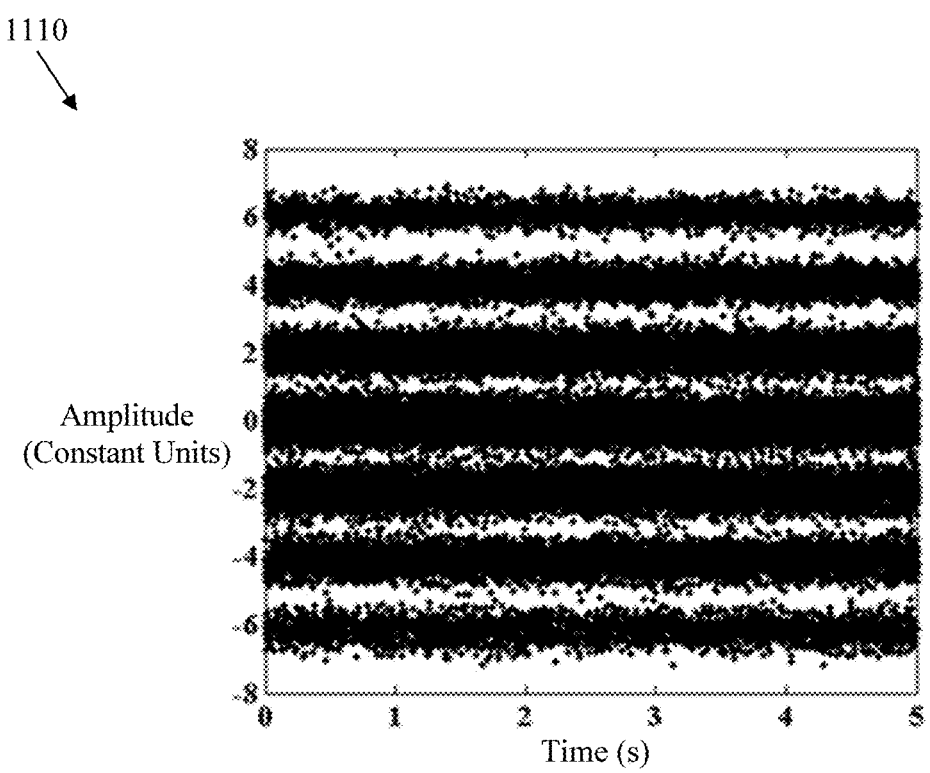
FIG. 11B is a graph illustrating a seven-level PAM4 signal after higher-level CDR according to an embodiment of the disclosure.

FIG. 11B is a graph 1110 illustrating a seven-level PAM4 signal after higher-level CDR according to an embodiment of the disclosure. The x-axis represents time in seconds, and the y-axis represents amplitude in constant units. As shown, the higher-level CDR substantially eliminates ISI to produce a well-defined, seven-level signal unlike the four-level PAM4 signal in FIG. 11A.

Figure 12:
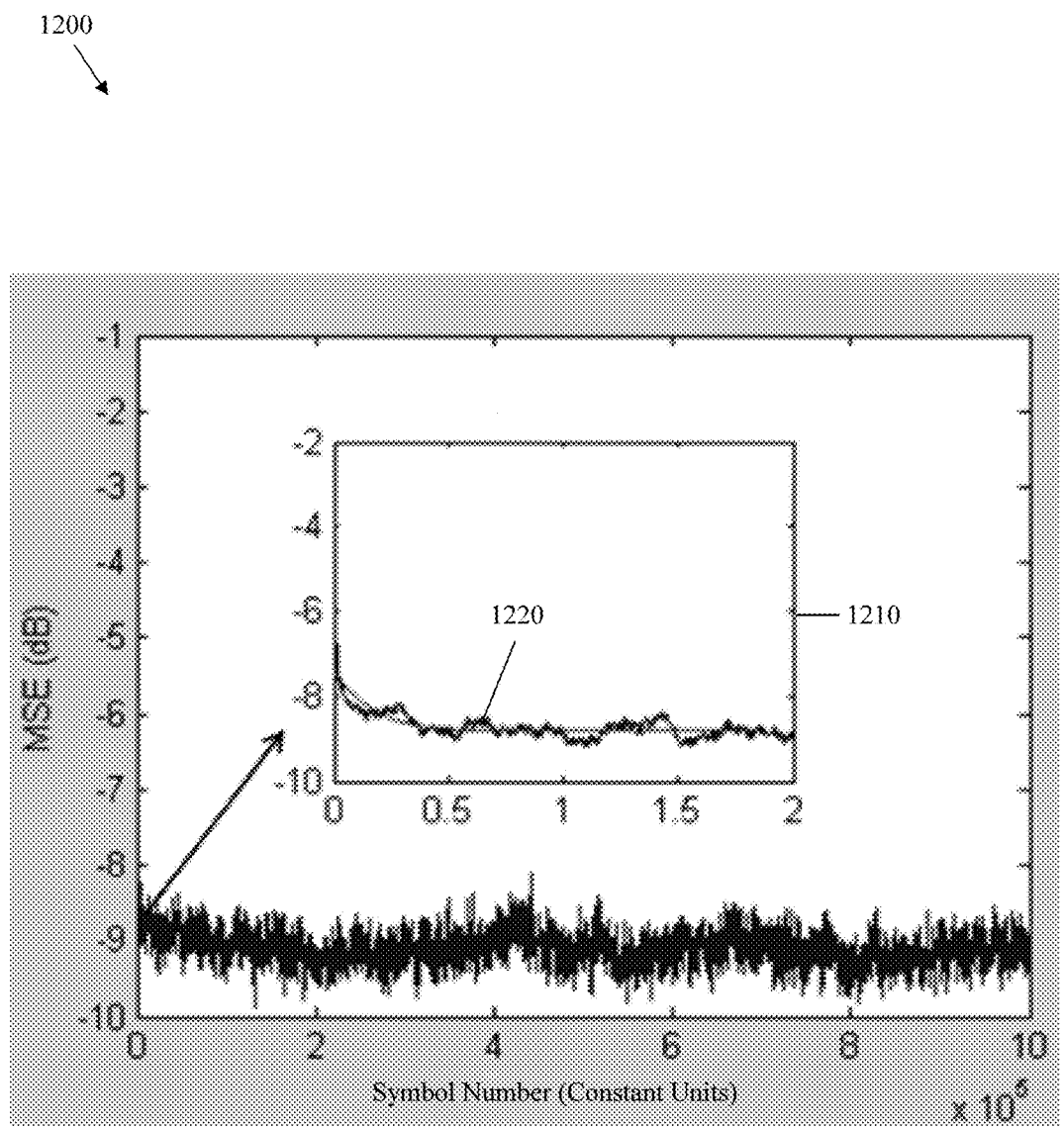
FIG. 12 is a graph illustrating an equalization error for the FFE in FIG. 7 equalizing a two-level NRZ signal using three-level equalization according to an embodiment of the disclosure.

FIG. 12 is a graph 1200 illustrating an equalization error for the FFE 740 in FIG. 7 equalizing a two-level NRZ signal using three-level equalization according to an embodiment of the disclosure. The graph 1200 comprises a sub-graph 1210 that is a magnified portion of the graph 1200 as indicated by an arrow. The x-axis represents a symbol number in constant units, and the y-axis represents an MSE in dB. Convergence occurs when a curve 1220 flattens out, which occurs at about 2,789 symbols after 111.56 ns. After convergence, the MSE is about −9 dB, which is about 2 dB lower than that shown in FIG. 3

FIG. 13 is a table 1300 illustrating a converging time for the FFE 740 in FIG. 7 equalizing a two-level NRZ signal using three-level equalization according to an embodiment of the disclosure. The table 1300 further illustrates the convergence time shown in FIG. 12. The table 1300 comprises three sets of values, a phase error in ui, a first converging time in bits, and a second converging time in ns. As shown, there is no phase error at the converging point of 2,789 symbols and 111.56 ns. the maximum CDR converging time of 4,048 symbols and 161.92 ns appears at the sampling point with 3/16 ui phase error.

Figure 14:
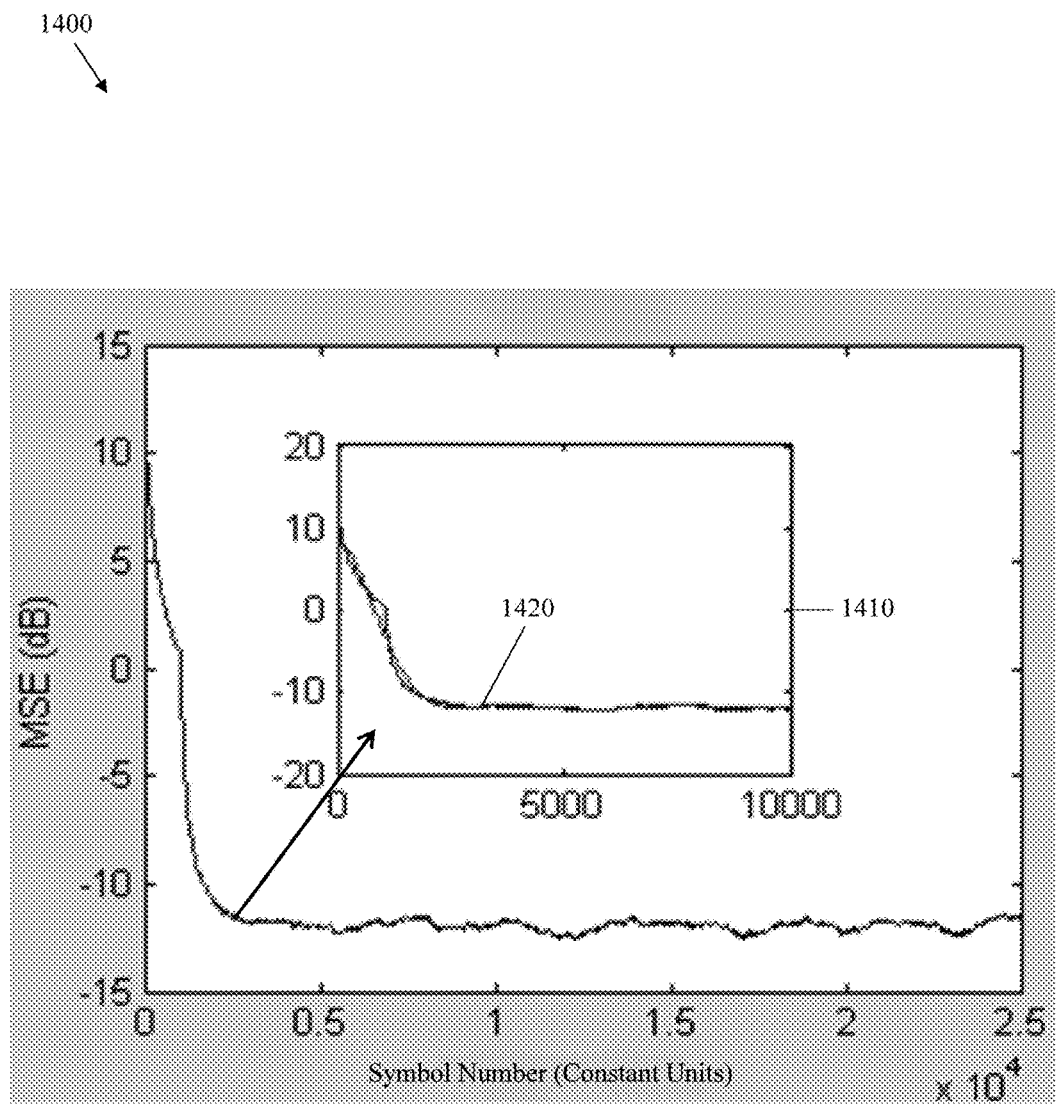
FIG. 14 is a graph illustrating an equalization error for the FFE in FIG. 7 equalizing a four-level PAM4 signal using seven-level equalization according to an embodiment of the disclosure.

FIG. 14 is a graph 1400 illustrating an equalization error for the FFE 740 in FIG. 7 equalizing a four-level PAM4 signal using seven-level equalization according to an embodiment of the disclosure. The graph 1400 comprises a sub-graph 1410 that is a magnified portion of the graph 1400 as indicated by an arrow. The x-axis represents a symbol number in constant units, and the y-axis represents an MSE in dB. Convergence occurs when a curve 1420 flattens out, which occurs at about 2,936 symbols after 117.44 ns. After convergence, the MSE is about −12 dB, which is about 7 dB lower than that shown in FIG. 5

FIG. 15 is a table 1500 illustrating a converging time for the FFE 740 in FIG. 7 equalizing a four-level PAM4 signal using seven-level equalization according to an embodiment of the disclosure. The table 1500 further illustrates the convergence time shown in FIG. 14. The table 1500 comprises three sets of values, a phase error in ui, a first converging time in bits, and a second converging time in ns. As shown, the maximum CDR converging time of 2,783 symbols and 111.72 ns appears at the sampling point with 6/16 ui phase error.

In comparing FIGS. 3-4 to FIGS. 12-13, the higher-level CDR reduces a convergence time for two-level NRZ signals from 51,911 symbols after 2.07 μs to 2,789 symbols after 111.56 ns. In other words, the higher-level CDR converges at least 18.5 times quicker. In comparing FIGS. 5-6 to FIGS. 14-15, the higher-level CDR reduces a convergence time for four-level PAM4 signals from 7,537 symbols after 301.48 ns to 2,936 symbols after 117.44 ns. In other words, the higher-level CDR converges at least 2.5 times quicker.

Figure 16:
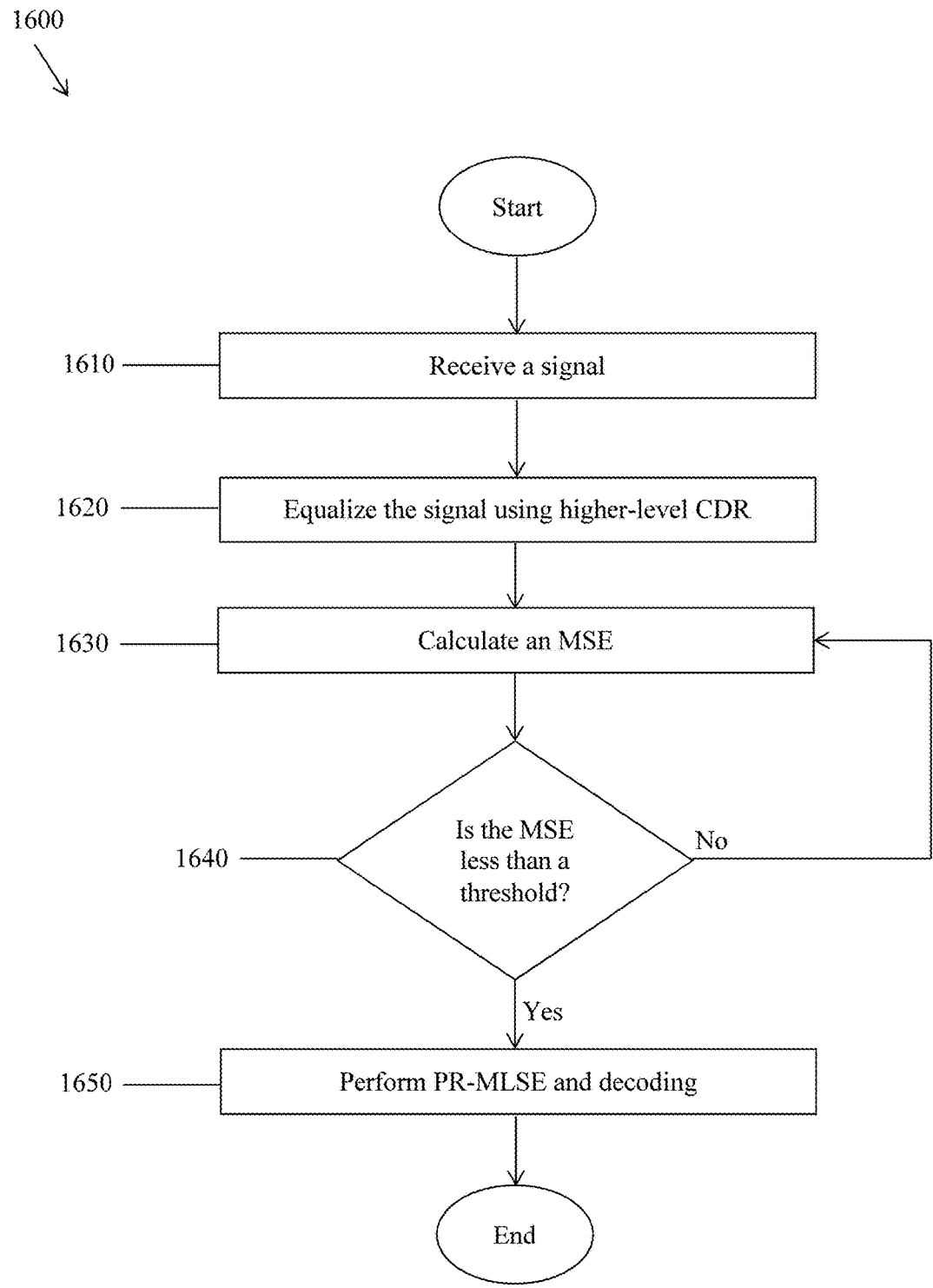
FIG. 16 is a flowchart of a method of performing higher-level CDR according to an embodiment of the disclosure.

FIG. 16 is a flowchart of a method 1600 of performing higher-level CDR according to an embodiment of the disclosure. The receiver 700 performs the method 1600. At step 1610, a signal is received. For instance, the PD 710 receives an optical signal. At step 1620, the signal is equalized using higher-level CDR. For instance, after the PD 710, TIA 715, and ADC 725 convert the optical signal into a digital signal, the CDR sub-system 730 performs CDR, including FFE, as described above. In the meantime, the CDR sub-system 730 adaptively updates the tap weights. As a first example, the CDR sub-system 730 performs CDR of a two-level NRZ signal using three-level equalization. As a second example, the CDR sub-system 730 performs CDR of a four-level PAM4 signal using seven-level equalization. At step 1630, an MSE is calculated. For instance, the error calculator 744 calculates the MSE of the equalization error. At decision diamond 1640, it is determined whether the MSE is less than a threshold. For instance, the error threshold comparator 742 determines whether the MSE is less than the threshold described above. If it is not, then the method 1600 returns to step 1630. If it is, then the method 1600 proceeds to step 1650. Finally, at step 1650, PR-MLSE and decoding are performed. For instance, the PR-MLSE component 755 performs PR-MLSE and the decoder 760 performs decoding.

Figure 17:
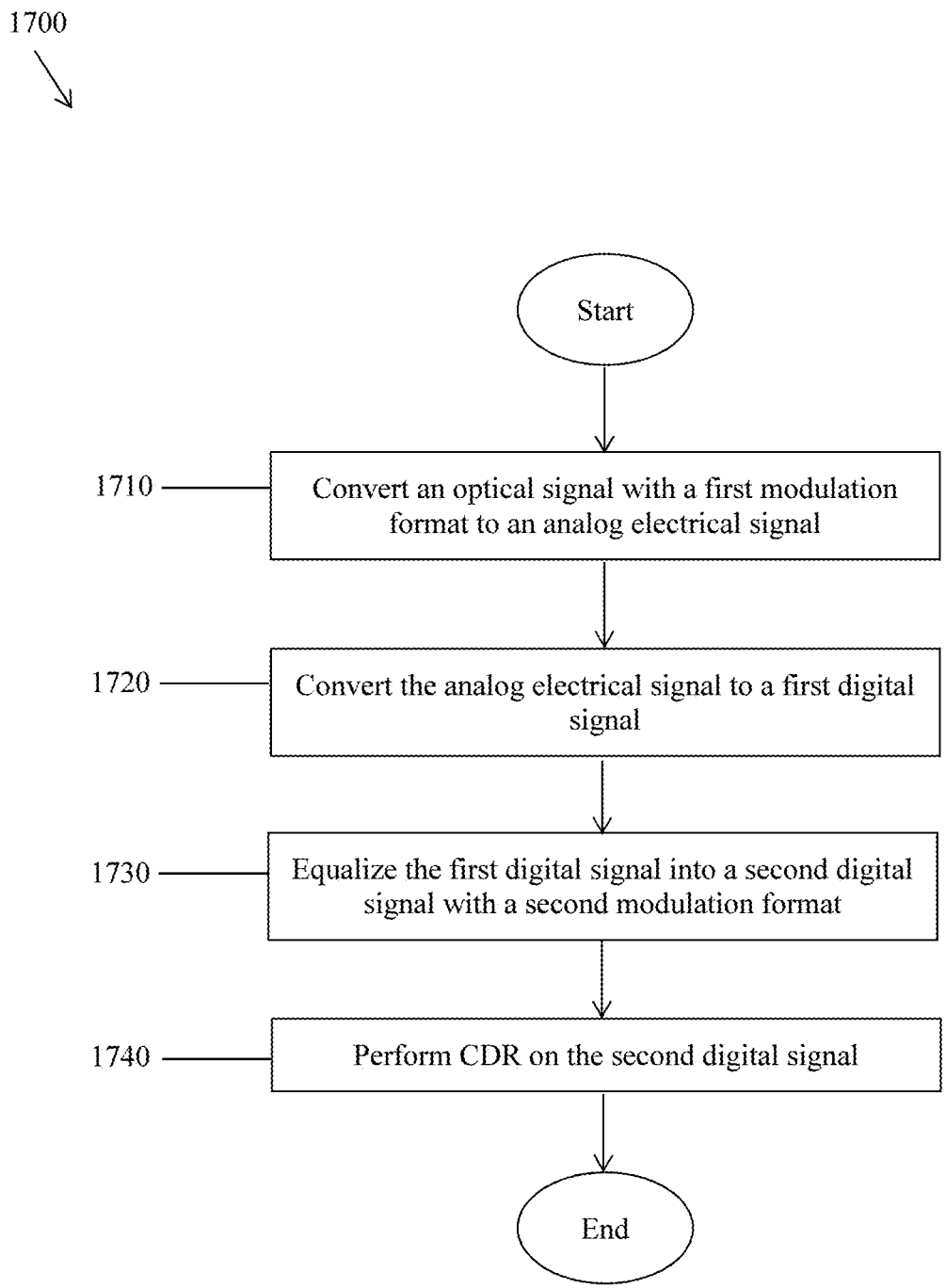
FIG. 17 is a flowchart of a method of performing higher-level CDR according to another embodiment of the disclosure.

FIG. 17 is a flowchart of a method 1700 of performing higher-level CDR according to another embodiment of the disclosure. The receiver 700 performs the method 1700. At step 1710, an optical signal with a first modulation format is converted to an analog electrical signal. For instance, the PD 710 converts the optical signal into an electric current signal, and the TIA 715 converts the electric current signal into an amplified voltage signal, which is an analog electrical signal. At step 1720, the analog electrical signal is converted to a first digital signal. For instance, the ADC 725 converts that analog electrical signal to a first digital signal at the first level. At step 1730, the first digital signal is equalized into a second digital signal with a second modulation format. For instance, the CDR sub-system 730 equalizes the first digital signal into the second digital signal at the second level. The second modulation format has more levels than the first modulation format. Finally, at step 1740, CDR is performed on the second digital signal. For instance, the CDR sub-system 730 performs CDR on the second digital signal.

In an example embodiment, an apparatus comprises: an OE element configured to convert an optical signal with a first modulation format to an analog electrical signal; an ADC element coupled to the OE element and configured to convert the analog electrical signal to a first digital signal; and a CDR element coupled to the OE element and configured to: equalize the first digital signal into a second digital signal with a second modulation format, wherein the second modulation format has more levels than the first modulation format; and perform CDR on the second digital signal.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, units, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
   an optical-to-electrical (OE) component configured to convert an optical signal with a first modulation format to an analog electrical signal;
   an analog-to-digital converter (ADC) coupled to the OE component and configured to convert the analog electrical signal to a first digital signal; and
   a clock and data recovery (CDR) sub-system coupled to the ADC and configured to:
     equalize the first digital signal into a second digital signal with a second modulation format, the second modulation format having more levels than the first modulation format; and
     perform CDR on the second digital signal.

2. The apparatus of claim 1, further comprising a partial response maximum-likelihood sequence estimation (PR-MLSE) component coupled to the CDR sub-system and configured to equalize the second digital signal into a third digital signal with the first modulation format.

3. The apparatus of claim 2, wherein the PR-MLSE component is further configured to further equalize the second digital signal using PR-MLSE.

4. The apparatus of claim 2, wherein the CDR sub-system comprises a feed-forward equalizer (FFE), a decision component, a subtractor, and a tap weight updater that form a feedback loop, and wherein the PR-MLSE component is outside the feedback loop.

5. The apparatus of claim 1, wherein the first modulation format has two levels for a non-return-to-zero (NRZ) signal and the second modulation format has three levels.

6. The apparatus of claim 1, wherein the first modulation format has four levels for a four-level pulse-amplitude modulation (PAM4) signal and the second modulation format has seven levels.

7. The apparatus of claim 1, wherein the CDR sub-system comprises a feed-forward equalizer (FFE) configured to:
perform the CDR for phase adjustment; and
perform equalization for inter-symbol interference (ISI) compensation.

8. The apparatus of claim 7, wherein the FFE is further configured to adaptively track frequency offset and jitter.

9. The apparatus of claim 1, wherein the CDR sub-system is further configured to perform equalization until a mean square error (MSE) of an equalized signal is below a predetermined threshold.

10. The apparatus of claim 1, wherein the apparatus is an optical line terminal (OLT), and wherein the analog electrical signal is a burst-mode signal.

11. The apparatus of claim 1, wherein the OE component is a photodiode (PD) or a combination of the PD and a transimpedance amplifier (TIA).

12. An apparatus comprising:
a clock and data recovery (CDR) sub-system comprising:
a feed-forward equalizer (FFE);
a decision component coupled to the FFE and comprising a decision component output;
a subtractor coupled to the FFE and the decision component output; and
a tap weight updater coupled to the subtractor and the FFE; and
a partial response maximum-likelihood sequence estimation (PR-MLSE) component coupled to the CDR sub-system,
the FFE is configured to pass an equalized signal to the decision component, the subtractor, and the PR-MLSE component.

13. The apparatus of claim 12, further comprising an analog-to-digital converter (ADC) coupled to the CDR sub-system.

14. The apparatus of claim 13, further comprising a voltage-controlled oscillator (VCO) coupled to the ADC.

15. The apparatus of claim 13, further comprising a transimpedance amplifier (TIA) coupled to the ADC.

16. The apparatus of claim 15, further comprising a photodiode (PD) coupled to the TIA.

17. The apparatus of claim 12, further comprising a decoder coupled to the PR-MLSE component.

18. A method comprising:
converting an optical signal with a first modulation format to an analog electrical signal;
converting the analog electrical signal to a first digital signal;
equalizing the first digital signal into a second digital signal with a second modulation format, wherein the second modulation format has more levels than the first modulation format; and
performing clock and data recovery (CDR) on the second digital signal.

19. The method of claim 18, further comprising equalizing the second digital signal into a third digital signal with the first modulation format using partial response maximum-likelihood sequence estimation (PR-MLSE).

20. The method of claim 18, further comprising performing equalization until a mean square error (MSE) of an equalized signal is below a predetermined threshold.

21. The apparatus of claim 12, wherein the PR-MLSE component is further coupled to the FFE, the decision component, and the subtractor.

22. The apparatus of claim 12, wherein the subtractor is configured to:
receive the equalized signal from the FFE;
receive a decision datum from the decision component; and
calculate an error signal based on the equalized signal and the decision datum.

* * * * *